United States Patent [19]
Hatter et al.

[11] Patent Number: 5,993,771
[45] Date of Patent: *Nov. 30, 1999

[54] TETRATHIOCARBONATE CONTINUOUS PROCESS

[75] Inventors: Marjorie M. Hatter, Fullerton; Charles F. Wong, Yorba Linda, both of Calif.

[73] Assignee: Entek Corporation, Elkridge, Md.

[*] Notice: This patent is subject to a terminal disclaimer.

[21] Appl. No.: 07/841,903

[22] Filed: Feb. 25, 1992

Related U.S. Application Data

[63] Continuation of application No. 07/735,670, Jul. 26, 1991, abandoned, which is a continuation of application No. 07/440,024, Nov. 21, 1989, abandoned.

[51] Int. Cl.⁶ .................................................. C01B 31/00
[52] U.S. Cl. .............................................................. 423/414
[58] Field of Search ................... 423/414, 511, 423/562

[56] References Cited

U.S. PATENT DOCUMENTS 4,726,144  2/1988  Yang et al. .............................. 405/263

OTHER PUBLICATIONS

Journal of the Chemical Socieetey, 1921, vol. 119, pp. 38–54, Yeoman: Tritiocarbonates and Perthiocarbonates. III. Trithiocarbonates and Perthiocarbonates.

Journal of the Chemical Society, vol. 89(II), 1906, pp. 1812–1818, O'Donoghue and Kahan: CLXXIV. Thiocarbonic Acid and some of its Salts.

Journal of Chemical Society, vol. 128(II), 1928, pp. 2326–2332, Mills and Robinson: Ammonium Polysulphides. CCCVI—Ammonium Polysulphides, Hydrogen Pentasulphide, and the Thiocarbonic Acids.

Topics in Sulfur Chemistry, vol. 2, "Carbon Sulfides and Their Inorganic and Complex Chemistry", by G. Gattow and W. Behrendt, Georg Thieme Publishers Stuttgart 1977, pp. 154–178.

*Primary Examiner*—Michael Lewis
*Assistant Examiner*—Stuart Hendrickson
*Attorney, Agent, or Firm*—Christie, Parker & Hale, LLP

[57] ABSTRACT

Salts of tetrathiocarbonic acid are produced by a process in which a hydroxide, sulfur, carbon disulfide and hydrogen sulfide are reacted continuously. The salts are produced as aqueous solutions having concentrations of about 15 to about 55 percent by weight.

27 Claims, 1 Drawing Sheet

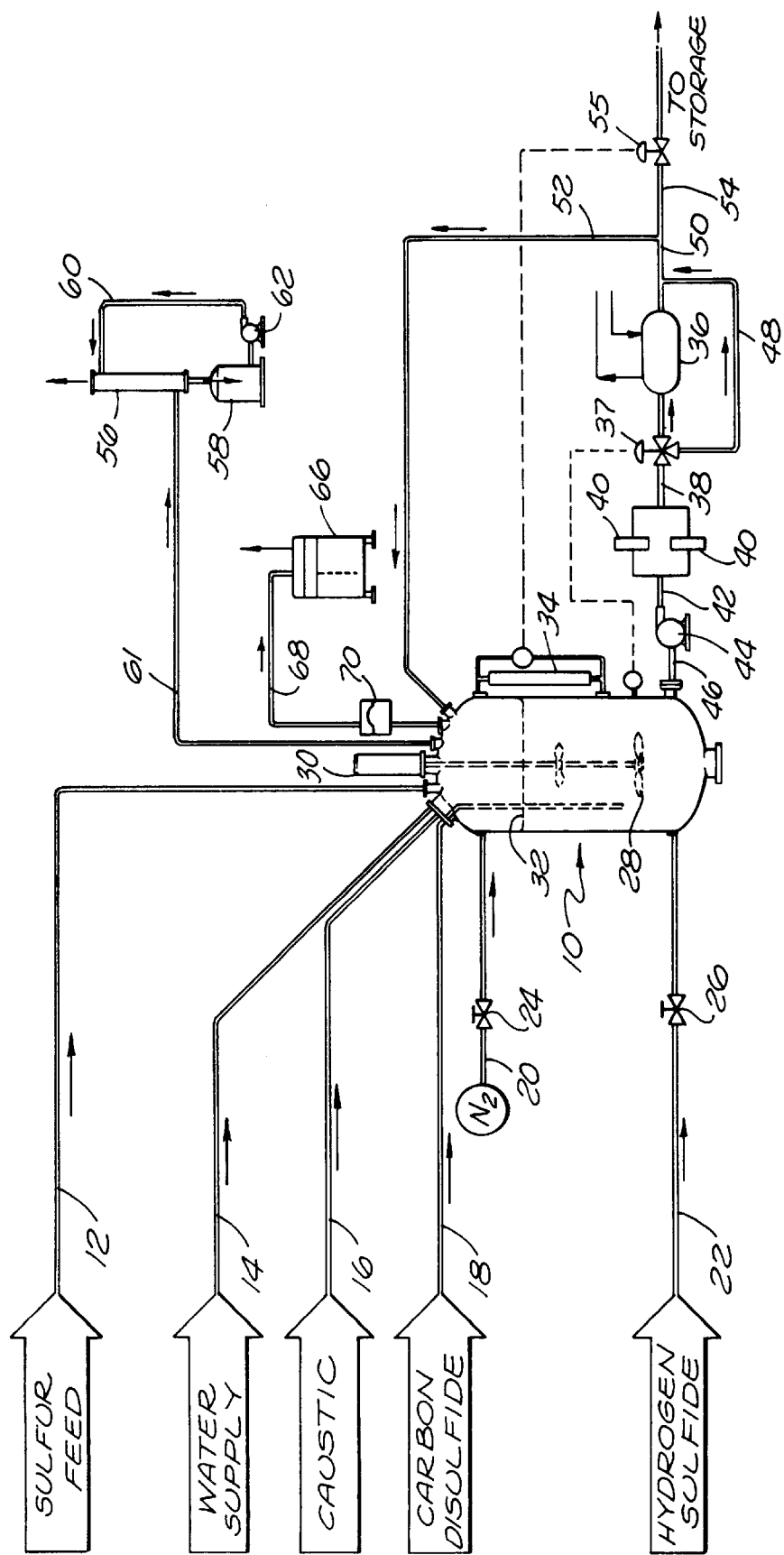

TETRATHIOCARBONATE CONTINUOUS PROCESS

This application is a continuation of application Ser. No. 07/735,670, filed Jul. 26, 1991, abandoned, which is a continuation of application Ser. No. 07/440,024, filed Nov. 21, 1989, now abandoned.

FIELD OF THE INVENTION

This invention relates to the manufacture of salts of tetrathiocarbonic acid. In one of its more particular aspects this invention relates to a continuous process for manufacturing aqueous solutions of tetrathiocarbonates on a commercial scale.

BACKGROUND OF THE INVENTION

The chemistry of thiocarbonic acids and their salts has been studied in some detail, as indicated by O'Donoghue and Kahan, Journal of the Chemical Society, Vol. 89(II), pages 1812–1818 (1906); Yeoman, Journal of the Chemical Society, Vol. 119, pages 38–54 (1921); Mills and Robinson, Journal of the Chemical Society, Vol. 128(II), pages 2326–2332 (1928) and by Stone et al. in U.S. Pat. No. 2,893,835, dated Jul. 7, 1959.

According to O'Donoghue and Kahan, as far back as 1826 derivatives of thiocarbonic acid were prepared by Berzelius, who reacted aqueous solutions of hydrosulfides with carbon disulfide to give unstable solutions which yielded unstable crystalline salts in accordance with the following reaction:

$$2KSH + CS_2 => K_2CS_3 + H_2S \qquad (1)$$

Other thiocarbonates were prepared and further characterized by O'Donoghue and Kahan. Their paper, at page 1818, reports the formation of ammonium thiocarbonate by reacting liquid ammonia with cold alcoholic thiocarbonic acid prepared by dropping a solution of calcium thiocarbonate into concentrated hydrochloric acid to produce free thiocarbonic acid ($H_2CS_3$). The calcium thiocarbonate utilized by the authors is described as a double salt, including the calcium cation in combination with both the hydroxide and the trithiocarbonate anions. In addition to free thiocarbonic acid, other compounds prepared by O'Donoghue and Kahan included the sodium, potassium, zinc and lead salts. However, regardless of which of these salts were prepared, a common characteristic was their relative instability, with the prepared compounds breaking down and releasing carbon disulfide and hydrogen sulfide and/or a metal sulfide, often in a matter of minutes.

The noted paper by Yeoman reports a further study of thiocarbonates (called trithiocarbonates therein) and also reports the preparation and properties of perthiocarbonates (or tetrathiocarbonates), derivatives of tetrathiocarbonic acid ($H_2CS_4$). Yeoman reports on methods of preparing the ammonium, alkali metal and alkaline earth metal salts of these acid species. For example, Yeoman prepared ammonium trithiocarbonate by saturating an alcoholic ammonia solution with hydrogen sulfide and then adding carbon disulfide to precipitate the product salt. Ammonium perthiocarbonate was prepared in a similar manner, except that after reacting the ammonia and hydrogen sulfide, elemental sulfur was added to form the disulfide, $(NH_4)_2S_2$; adding carbon disulfide immediately precipitated the product.

Yeoman states that solutions of both ammonium trithiocarbonate and perthiocarbonate are very unstable due both to decomposition to form thiocyanate as a product, and to complete dissociation back into ammonia, hydrogen sulfide and carbon disulfide.

Considerable explanation is provided concerning the stability of thiocarbonates, as exemplified by sodium trithiocarbonate and perthiocarbonate. Sodium trithiocarbonate solutions in water are said to remain stable only if oxygen and carbon dioxide are rigidly excluded; the presence of oxygen causes decomposition to form carbon disulfide and thiosulfates, while carbon dioxide decomposes the solution to form a carbonate, elemental sulfur, carbon disulfide and hydrogen sulfide. Potassium trithiocarbonate behaves similarly, according to Yeoman.

Yeoman also attempted to prepare and characterize the stability of thiocarbonate salts of four of the alkaline earth metals. Yeoman was unable to prepare a pure calcium tri- or tetrathiocarbonate, but did observe that the double salt of calcium trithiocarbonate which he prepared was more stable (probably because it was less hygroscopic) than the sodium or potassium thiocarbonates. The barium salt of tetrathiocarbonic acid could not be isolated, although Yeoman believed it existed in solution. Solid barium trithiocarbonate could not be isolated, although it was alleged to behave like sodium trithiocarbonate when dissolved in water. The preparation of aqueous solutions of the tri- and tetrathiocarbonates of magnesium and strontium was alleged, but the magnesium thiocarbonates were not isolated.

The previously noted paper by Mills and Robinson shows the preparation of ammonium thiocarbonate by digesting ammonium pentasulfide with carbon disulfide. The ammonium pentasulfide was obtained by suspending sulfur in aqueous ammonia, then saturating with hydrogen sulfide. A crystalline residue from the reaction was found to be ammonium perthiocarbonate. The authors prepared a "better" ammonium perthiocarbonate product, however, by extracting the ammonium pentasulfide with carbon disulfide in a Soxhlet apparatus.

Stone et al. disclose several methods for preparing solid ammonium, alkali and alkaline earth metal salts of tri- and tetraperoxythiocarbonates, hereinafter referred to simply as "tetrathiocarbonates." One such method involves the solution of an active metal such as sodium in anhydrous ethanol to form an ethoxide which, in turn, is reacted with hydrogen sulfide and carbon disulfide to form sodium trithiocarbonate. They report, however, that the trithiocarbonates tend to be quite soluble in ethanol, and if it is desired to recover the solid material from the solution, it is necessary to treat the reaction mixture with a "displacing agent" such as ether, in which case the thiocarbonates frequently separate, not as solids, but as difficultly crystallizable oils which appear to be saturated aqueous solutions of the trithiocarbonate salt. Consequently, such a procedure is not considered feasible for use on a commercial scale. Similar problems were reported with tetrathiocarbonate salts, which were prepared using procedures analogous to those for the trithiocarbonates.

These problems were reportedly solved by carrying out the preparation reaction in a medium which is composed of a major part of a nonsolvent for the reaction components and a minor proportion of a liquid which is miscible with the nonsolvent and which is a solvent, to a measurable degree, for inorganic sulfides. The preferred nonsolvents used were relatively low boiling hydrocarbon materials such as hexane, cyclohexane and benzene. The second solvent was preferably ethanol, isopropanol or dioxane.

Basic physical and chemical properties of these materials and a number of methods for making them are summarized in considerable detail, starting at page 154 in "Carbon Sulfides and their Inorganic and Complex Chemistry" by G. Gattow and W. Behrendt, Volume 2 of "Topics in Sulfur Chemistry", A. Senning, Editor, George Thieme Publishers, Stuttgart, 1977.

What is needed is a process for the manufacture of salts of tetrathiocarbonic acid which is convenient and less cumbersome than the processes previously used. Such process should be capable of providing aqueous solutions of tetrathiocarbonates on a continuous basis and on a commercial scale. The present invention provides such a process.

SUMMARY OF THE INVENTION

The present invention provides a continuous process for the production of salts of tetrathiocarbonic acid which is capable of providing aqueous solutions of tetrathiocarbonates in concentrations useful for various commercial applications, such as in the control of nematodes and other soil-borne and water-borne pathogens.

According to the process of the present invention aqueous solutions of tetrathiocarbonates can be produced in a continuous process in relatively high concentrations, such as about 30 percent by weight or more by continuously feeding water, a hydroxide, sulfur, carbon disulfide and hydrogen sulfide; continuously reacting the hydroxide, sulfur, carbon disulfide and hydrogen sulfide; and continuously recovering an aqueous solution of a salt of tetrathiocarbonic acid.

The reactions occurring simultaneously in a continuous process for the production of sodium tetrathiocarbonate are the following:

$$2NaOH + H_2S \Rightarrow Na_2S + 2H_2O \tag{1}$$

$$Na_2S + S \Rightarrow Na_2S_2 \tag{2}$$

$$Na_2S_2 + CS_2 \Rightarrow Na_2CS_4 \tag{3}$$

$$Na_2S + CS_2 \Rightarrow Na_2CS_3 \tag{4}$$

$$Na_2CS_3 + S \Rightarrow Na_2CS_4 \tag{5}$$

Adding water, sodium hydroxide, molten sulfur, carbon disulfide and hydrogen sulfide simultaneously but separately to a reactor and continuously reacting under controlled conditions results in a product which comprises an aqueous solution having a concentration of 30 percent by weight or more of sodium tetrathiocarbonate. These tetrathiocarbonate solutions are stable and directly toxic to many plant pathogens, breaking down in soil to release carbon disulfide, which acts as a fumigant. Tetrathiocarbonates are biodegradable, producing sulfates and carbonates, and leave no residue in the soil or in plants treated with tetrathiocarbonates.

BRIEF DESCRIPTION OF THE DRAWING

The sole FIGURE of the drawing is a schematic representation of a flowsheet in partial elevation showing a system for conducting the process of the present invention including a continuous stirred tank reactor and its auxiliary equipment.

DESCRIPTION OF THE PREFERRED EMBODIMENTS

In the process of the present invention, a hydroxide, hydrogen sulfide, sulfur and carbon disulfide are reacted continuously in approximately stoichiometric quantities in a water medium to produce aqueous tetrathiocarbonate solutions preferably having concentrations of about 15 percent by weight or more, more preferably concentrations of about 30 to about 55 percent, and most preferably about 40 to about 50 percent by weight of the tetrathiocarbonate salt. Higher concentrations are particularly desirable because increased throughputs are possible and shipping costs are lower. Although the reactants are typically present in stoichiometric quantities, an excess of about 5 percent to about 10 percent by weight of the hydroxide and hydrogen sulfide have been found desirable to stabilize the product tetrathiocarbonate solutions. Especially preferred are an excess of about 10 percent of the hydroxide and about 5 percent of the hydrogen sulfide.

The description of the invention will proceed using sodium tetrathiocarbonate as an example of the tetrathiocarbonates to which the present invention is directed. It should be understood, however, that other tetrathiocarbonates, such as potassium tetrathiocarbonate, ammonium tetrathiocarbonate, lithium tetrathiocarbonate, calcium tetrathiocarbonate and magnesium tetrathiocarbonate can be similarly prepared by using the corresponding hydroxide.

The process can be conducted in any convenient reaction vessel in which the reactants can be introduced simultaneously and continuously and thoroughly mixed, and in which the reaction temperature can be maintained as desired. Temperature control can be provided by either external or internal heat exchangers. Pressure is not a major consideration. Superatmospheric pressures, usually in the range of about 5 psig. to about 30 psig. are typically employed. A continuous stirred tank reactor (CSTR), for example, is ideally suited for conducting the process of the present invention.

A continuous process for the manufacture of sodium tetrathiocarbonate requires that all chemical reactants be essentially completely reacted in order to ensure that the reactions depicted in Reactions (1), (2), (3), (4) and (5) are effective to produce the desired product and to avoid severe operating problems. For instance, if sulfur is not completely reacted, it will remain as a solid and plug product filters and piping. If $CS_2$ is not completely reacted, it will vaporize and significantly increase the reactor pressure. Moreover, $CS_2$ will also compete with $Na_2S$ and $Na_2CS_3$ for sulfur, resulting in incomplete reaction and plugging of piping and equipment.

In a continuous process all possible reaction paths are competing. The dominant reaction path is the one having the fastest global kinetics. Which reaction path will predominate can, to some extent, be determined by choice of reaction conditions, such as temperature, concentration and residence time.

For example, at low temperatures and low concentrations the reaction path which predominates is the path defined by reactions (1), (4) and (5), whereas at high temperatures the predominant reaction path is the path defined by reactions (1), (2) and (3).

Reaction (1), which is common to both paths, is an ionic reaction and is very fast. This reaction, which is the fastest reaction in the entire sequence of reactions, is instantaneous and complete.

If the temperature and the product concentration are both low, the reaction of $CS_2$ with $Na_2S$ (Reaction 4) and the reaction of $CS_2$ with $Na_2S_2$ (Reaction 3) have the next higher reaction rates. The reaction rate of Reaction 3 is mass transfer limited and depends upon the concentration of $CS_2$ in the aqueous phase, in which the reaction occurs. This reaction is slower at higher temperatures because the solubility of $CS_2$ in water decreases with increasing temperature. The reaction of $Na_2S$ with $CS_2$ (Reaction 4) is kinetically limited at low temperatures and increases with increasing temperature until the solubility becomes limiting.

The slowest reactions and those most sensitive to temperature are the addition of sulfur to $Na_2S$ (Reaction 2) and the addition of sulfur to $Na_2CS_3$ (Reaction 5). Normally, molten sulfur is present in the form of an eight-membered ring structure, $S_8$, as monoclinic sulfur. The effect of heat and the presence of hydroxide ions is to open the sulfur ring, thereby transforming the ringed monoclinic sulfur to a linear form. The resulting linear form is either a linear organized structure, rhombic sulfur, or a linear unorganized structure, amorphous sulfur. Either $Na_2S$ or $Na_2CS_3$ will swallow the sulfur molecules at one or both ends of the sulfur chain to form, in the case of $Na_2S$, a polysulfide, $Na_2S_x$ such as $Na_2S_2$ or, in the case of $Na_2CS_3$, the corresponding tetrathiocarbonate, $Na_2CS_4$. Increasing the temperature increases the rate of both sulfur reactions, but particularly the rate of the reaction of sulfur with $Na_2CS_3$, which is the slowest reaction and is rate limiting under most operating conditions. The reaction path which predominates at lower temperatures and lower concentrations is therefore the path defined by Reactions 1, 4 and 5.

At higher temperatures and concentrations the reactions of $CS_2$ become rate limiting because the solubility of $CS_2$ in the aqueous reaction phase is depressed by the high temperature and the high concentration of $Na_2CS_4$. As the temperature increases, the rate of Reaction 4 increases until it is limited by the solubility of $CS_2$. At this time Reaction 4 proceeds at the same rate as Reaction 3. As a result, for higher concentrations and lower residence times, the maximum temperature is limited. At higher temperatures, the sulfur reactions proceed at a faster rate, so that the reaction path which predominates at higher temperatures is the path defined by Reactions 1, 2, and 3.

In general, a continuous process requires that reactor volume, reactor temperature, reactant feed rates and product compositions be correlated so that sufficient residence time is provided for complete conversion to the desired product. Compared to a batch process, where the required reaction time can be readily provided, in a continuous process the residence time determines the reaction time.

A continuous process is decidedly advantageous, first and foremost because a continuous process is generally the most convenient and efficient way to conduct chemical reactions, assuming the intended chemical reaction or reactions can be run continuously.

Production rates of continuous processes can be several times those of batch processes. For example, whereas a batch process may be capable of producing about 4,000 pounds per day of an aqueous solution of sodium tetrathiocarbonate having a concentration of about 30 percent to about 35 percent by weight, the continuous process of the present invention can produce about 15,000–20,000 pounds of product solution per day using the same reactor size.

Another advantage of the continuous process of the present invention is that it is capable of producing concentrations of sodium tetrathiocarbonate higher than those produced in a batch process, that is, concentrations of up to about 55 percent by weight. Even higher concentrations can be produced using the process of the present invention. However, at concentrations over about 55 percent by weight the reaction rate falls off because the solubility of $CS_2$ in the aqueous reaction phase is reduced and because carbonate contaminants introduced with the water begin to precipitate. The latter problem can be circumvented by using carbonate-free and bicarbonate-free water.

Referring now to the drawing a continuous stirred tank reactor 10 is equipped with a sulfur feed conduit 12, a water supply conduit 14, a caustic (NaOH) conduit 16, a carbon disulfide conduit 18, a nitrogen ($N_2$) conduit 20 and a hydrogen sulfide conduit 22. Conduit 18 extends well into reactor 10. Conduit 20 contains a valve 24 and conduit 22 contains a valve 26. Reactor 10 is also equipped with a double stirrer 28 attached to a motor 30. Reactor 10 is shown containing a solution 32. Reactor 10 is fitted with a sight level gauge 34. A heat exchanger 36 is connected to reactor 10 via a 3-way temperature control valve 37, a conduit 38, filters 40, a conduit 42, a pump 44 and a conduit 46. A conduit 48, also connected to 3-way valve 37, serves as a bypass line for heat exchanger 36. A conduit 50 connects heat exchanger 36 to a conduit 52, which serves as a recycle line and a conduit 54, which is connected to a level control valve 55, and serves as a connection to storage tanks, not shown. A scrubber 56 is equipped with a caustic tank 58 and a recycle line 60, which is provided with a pump 62. Scrubber 56 is connected to reactor 10 by means of a conduit 64. An emergency scrubber 66 is connected to reactor 10 by means of a conduit 68 equipped with a rupture disk type of pressure relief valve 70.

In carrying out the process of the present invention, water is introduced into reactor 10 by means of water supply conduit 14. Although shown entering the top of the reactor, water can be introduced into the reactor at either the top or the bottom. Water is usually introduced at ambient conditions. However, under low temperatures it may be necessary to heat the water in order to prevent freezing.

The hydroxide is introduced into the reactor at the top or bottom as desired. In the drawing caustic is shown entering reactor 10 at the top via caustic conduit 16. Depending upon the particular tetrathiocarbonate being produced, the corresponding hydroxide such as sodium hydroxide, potassium hydroxide, ammonia, lithium hydroxide, calcium hydroxide or magnesium hydroxide, for example, is introduced as an aqueous solution. Concentrations of about 10 percent to about 70 percent by weight are typically used. Preferably concentrations of about 20 percent to about 60 percent and more preferably about 40 percent to about 50 percent are used. The hydroxide can be introduced under ambient conditions. However, it is important that the temperature of the hydroxide feed be kept above its freezing temperature.

Sulfur is fed into reactor 10 at the top via sulfur feed conduit 12. Sulfur in the molten state is sprayed into the reactor through the vapor space above the surface of the liquid. Preferably the molten sulfur is normally introduced through a heated nozzle to prevent sulfur from plugging the nozzle in the relatively colder operating temperature of the reactor. The molten sulfur is normally introduced at a temperature of about 250° F. to about 300° F., preferably about 275° F. to about 285° F. Typically, particle sizes of the sprayed molten sulfur droplets of about $\frac{1}{32}$ inch to about $\frac{3}{8}$ inch in diameter are used. Particle sizes of less than about $\frac{1}{8}$ inch in diameter have been found to produce the best results. Care should be taken that the molten sulfur particles do not contact any metal surface within the reactor in order that the sulfur in the molten state is available for reaction instead of solidifying on metal surfaces within the reactor.

Carbon disulfide is introduced into reactor 10 via carbon disulfide conduit 18. It is introduced below the surface of the liquid in the reactor in order to make it available for reaction in solution 32 and to prevent its contacting sulfur particles in the vapor space above solution 32. Preferably the carbon disulfide is introduced close to stirrer 28 to ensure that the carbon disulfide is dispersed in the solution quickly and evenly. The carbon disulfide can be introduced at ambient conditions.

Hydrogen sulfide gas is introduced into reactor 10 via hydrogen sulfide conduit 22. The volume introduced is regulated by means of valve 26. The hydrogen sulfide is preferably sparged into solution 32 below stirrer 28 to ensure thorough mixing within the liquid phase and to take advantage of the hydrostatic head of the liquid within the reactor in effecting complete reaction of the hydrogen sulfide.

The process is commenced by filling the reactor with a heel of product and purging the vapor space above the solution with nitrogen gas introduced into reactor 10 via nitrogen conduit 20. The flow of nitrogen is controlled by means of valve 24. Nitrogen exits reactor 10 via conduit 64 which connects reactor 10 with scrubber 56. When the oxygen content in the reactor 10 is less than about 0.3 weight percent, valve 24 is closed to stop the flow of nitrogen. Simultaneously water, a hydroxide, hydrogen sulfide, molten sulfur and carbon disulfide are fed into the reactor with the result that the tetrathiocarbonate product is produced continuously as long as reactant feed rates are maintained.

Product is pumped out of reactor 10 by means of pump 44 through conduits 46 and 42 to filters 40 which function to remove any solids such as sulfur from the product stream. Filtered product is flowed to 3-way temperature control valve 37 which maintains the temperature of reactor 10 by directing the product stream either wholly or partly to heat exchanger 36 or bypass conduit 48. Most of the cooler product recycles back to reactor 10 via conduit 52. The rest of the product flows through conduit 54 to level control valve 55 to storage. Level control valve 55 maintains the liquid within reactor 10 at the desired operating level.

Gases collected in the vapor space of the reactor above the liquid level are vented from the reactor via conduit 64 through caustic scrubber 56. An emergency scrubber is provided as shown in the drawing. A rupture disk type of pressure relief valve 70 activates emergency scrubber 66 when the pressure within reactor 10 builds up to an unacceptable level.

As pointed out above, in order for the process of the present invention to produce desired product, reactor volume, reactor temperature, reactant feed rates and product composition are correlated. It is usual to express feed rates in terms of residence times, since residence time is inversely proportional to feed rate. The correlation between residence time and temperature of reaction, measured as temperature of the liquid phase, for various product compositions is shown in Table 1.

TABLE 1

| Product Concentration Weight Percent | Residence Time Hours | Temperature °F. |
| --- | --- | --- |
| 31.8 | 1.25 | 180 |
|  | 2.8 | 160 |
|  | 3.4 | 140 |
|  | 4.2 | 130 |
| 40 | 3.0 | 140 |
|  | 4.5 | 130 |
| 48 | 3.8 | 130 |
|  | 4.7 | 120 |
|  | 6.3 | 120 |
| 52 | 3.6 | 130 |

In general, temperatures of about 110° F. to about 180° F. at residence times of about 1 to about 7 hours are effective to produce concentrations of product tetrathiocarbonate in the range of about 30 percent by weight to about 55 percent by weight. Especially preferred are temperatures of about 130° F. to about 160° F. and residence times of about 2.5 to about 4.5 hours. Most preferred are temperatures of about 140° F. to about 150° F. and residence times of about 3 to about 4 hours.

The following example describes a process for manufacturing a 31.8 percent by weight aqueous solution of sodium tetrathiocarbonate. It is intended for purposes of illustration only and is not to be construed as implying any limitation on the scope of the present invention, which is defined in the appended claims.

EXAMPLE

A quantity of 140 gallons of a 31.8 percent by weight aqueous solution of sodium tetrathiocarbonate was introduced as a heel into a 200 gallon continuous stirred tank reactor. The reactor was purged with nitrogen and heated to 140° F. Water at a feed rate of 226 lbs./hr., a 50 percent by weight aqueous solution of sodium hydroxide at a feed rate of 151.1 lbs./hr., molten sulfur at a feed rate of 27.4 lbs./hr., carbon disulfide at a feed rate of 65 lbs./hr. and hydrogen sulfide gas at a feed rate of 30.5 lbs./hr. were continuously fed into the reactor. The molten sulfur was introduced at a temperature of 285° F. The reactor was maintained at a temperature of 145° F. and a pressure of 15 psig. A 31.8 percent by weight aqueous solution of sodium tetrathiocarbonate at a rate of 500 lbs./hr. was continuously produced.

The present invention thus provides a continuous process for producing salts of tetrathiocarbonic acid conveniently as stable aqueous solutions of high concentrations, for example, in the range of about 30 to about 55 percent by weight.

The invention may be embodied in other forms without departing from the spirit or essential characteristics thereof. For example, as pointed out above, other salts of tetrathiocarbonic acid than sodium tetrathiocarbonate can be prepared using the process of the present invention. Consequently the present embodiments are to be considered only as being illustrative and not restrictive, with the scope of the invention being indicated by the appended claims. All embodiments which come within the scope and equivalency of the claims are therefore intended to be embraced therein.

We claim:

1. A continuous process for producing an aqueous tetrathiocarbonate salt solution, the process comprising the steps of:

(a) continuously and substantially simultaneously introducing into a continuous stirred reaction zone (i) water, (ii) a hydroxide selected from the group consisting of sodium hydroxide, potassium hydroxide, lithium hydroxide, calcium hydroxide, and magnesium hydroxide, (iii) sulfur, (iv) carbon disulfide, and (v) hydrogen sulfide; and (b) while performing step (a), substantially simultaneously withdrawing an effluent comprising an aqueous tetrathiocarbonate salt solution from the reaction zone, the tetrathiocarbonate salt being selected from the group consisting of sodium tetrathiocarbonate, potassium tetrathiocarbonate, lithium tetrathiocarbonate, calcium tetrathiocarbonate, and magnesium tetrathiocarbonate, wherein (A) prior to the commencement of step (a), the reaction zone contains a heel of an aqueous tetrathiocarbonate salt solution, (B) the contents of the reaction zone are stirred during step (a), (C) step (a) is conducted at a superatmospheric pressure of about 5 to about 30 psig, (D) the sulfur and carbon disulfide are added to the reaction zone in approximately stoichiometric quantities, (E) the sulfur and carbon disulfide present in the reaction zone are essentially completely reacted, (F) the sulfur is sprayed into the reaction zone (i) through a vapor space above the aqueous solution, (ii) as molten sulfur droplets having a particle size less than about ⅛ inch, and (iii) without the molten sulfur droplets contacting the inside surface of the reaction zone, (G) the atmosphere in the reaction zone contains less than about 0.3 weight percent oxygen, (H) the reaction zone during step (a) is maintained at a temperature of about 110° to about 180° F., (I) the sulfur and carbon disulfide are substantially separately added to the contents of the reaction zone, and (J) the carbon disulfide is introduced into the reaction zone below the surface of the aqueous solution.

2. The process of claim 1 wherein the reaction zone during step (a) is maintained at a temperature of about 150° to about 180° F.

3. The process of claim 1 wherein the reaction zone during step (a) is maintained at a temperature of about 160° to about 180° F.

4. The process of claim 1 wherein the water employed in the process is carbonate-free and bicarbonate-free water.

5. The process of claim 1 wherein the water employed in the process is carbonate-free and bicarbonate-free water and the effluent contains greater than about 48 weight percent tetrathiocarbonate salt.

6. The process of claim 1 wherein the water employed in the process is carbonate-free and bicarbonate-free water and the effluent contains greater than about 50 weight percent tetrathiocarbonate salt.

7. The process of claim 1 wherein the water employed in the process is carbonate-free and bicarbonate-free water and the effluent contains greater than about 55 weight percent tetrathiocarbonate salt.

8. The process of claim 1 wherein the hydroxide is added to the reaction zone in a stoichiometric excess of about 5 to about 10 weight percent.

9. The process of claim 1 wherein the hydrogen sulfide is added to the reaction zone in a stoichiometric excess of about 5 to about 10 weight percent.

10. The process of claim 1 wherein the effluent contains 48 or more weight percent tetrathiocarbonate salt.

11. The process of claim 1 wherein the effluent contains about 50 to about 55 weight percent tetrathiocarbonate salt.

12. The process of claim 1 wherein the tetrathiocarbonate salt is selected from the group consisting of sodium tetrathiocarbonate, potassium tetrathiocarbonate, and lithium tetrathiocarbonate.

13. The process of claim 1 wherein the tetrathiocarbonate salt is selected from the group consisting of calcium tetrathiocarbonate and magnesium tetrathiocarbonate.

14. A continuous process for producing an aqueous tetrathiocarbonate salt solution, the process comprising the steps of:
 (a) continuously and substantially simultaneously introducing into a continuous stirred tank reactor (i) water, (ii) a hydroxide selected from the group consisting of sodium hydroxide, potassium hydroxide, lithium hydroxide, calcium hydroxide, and magnesium hydroxide, (iii) sulfur, (iv) carbon disulfide, and (v) hydrogen sulfide; and
 (b) while performing step (a), substantially simultaneously withdrawing an effluent comprising an aqueous tetrathiocarbonate salt solution from the reactor, wherein (A) prior to the commencement of step (a), the reactor contains a heel of an aqueous tetrathiocarbonate salt solution, (B) the contents of the reactor are stirred during step (a), (C) the pressure within the reactor during step (a) is about 5 to about 30 psig, (D) the sulfur and carbon disulfide are added to the reactor in approximately stoichiometric quantities, (E) the sulfur and carbon disulfide present in the reactor are essentially completely reacted, (F) the sulfur is fed into the reactor as molten sulfur droplets having a particle size less than about ⅛ inch, (G) the atmosphere in the reactor contains less than about 0.3 weight percent oxygen, (H) the reactor during step (a) is maintained at a temperature of about 130° to about 180° F., (I) the sulfur and carbon disulfide are substantially separately added to the contents of the reactor, the sulfur being sprayed into the reactor (i) through a vapor space above the aqueous solution and (ii) without the molten sulfur droplets contacting the inside surface of the reactor, and the carbon disulfide being introduced into the reactor below the surface of the aqueous solution, (J) the hydroxide is added to the reactor in a stoichiometric excess of about 5 to about 10 weight percent, (K) the hydrogen sulfide is added to the reactor in a stoichiometric excess of about 5 to about 10 weight percent, (L) the effluent contains 48 or more weight percent tetrathiocarbonate salt, and (M) the tetrathiocarbonate salt is selected from the group consisting of sodium tetrathiocarbonate, potassium tetrathiocarbonate, lithium tetrathiocarbonate, calcium tetrathiocarbonate, and magnesium tetrathiocarbonate.

15. The process of claim 14 wherein the water employed in the process is carbonate-free and bicarbonate-free water.

16. The process of claim 14 wherein the water employed in the process is carbonate-free and bicarbonate-free water and the effluent contains greater than about 48 weight percent tetrathiocarbonate salt.

17. The process of claim 14 wherein the water employed in the process is carbonate-free and bicarbonate-free water and the effluent contains greater than about 50 weight percent tetrathiocarbonate salt.

18. The process of claim 14 wherein the water employed in the process is carbonate-free and bicarbonate-free water and the effluent contains greater than about 55 weight percent tetrathiocarbonate salt.

19. The process of claim 14 wherein the effluent contains about 50 to about 55 weight percent tetrathiocarbonate salt.

20. The process of claim 14 wherein the tetrathiocarbonate salt is selected from the group consisting of sodium tetrathiocarbonate, potassium tetrathiocarbonate, and lithium tetrathiocarbonate.

21. The process of claim 14 wherein the reactor during step (a) is maintained at a temperature of about 140° to about 180° F.

22. A continuous process for producing an aqueous tetrathiocarbonate salt solution, the process comprising the steps of:
 (a) continuously and substantially simultaneously introducing into a continuous stirred tank reactor (i) water, (ii) a hydroxide selected from the group consisting of sodium hydroxide, potassium hydroxide, lithium hydroxide, calcium hydroxide, and magnesium hydroxide, (iii) sulfur, (iv) carbon disulfide, and (v) hydrogen sulfide; and
 (b) while performing step (a), substantially simultaneously withdrawing an effluent comprising a tetrathiocarbonate salt solution from the reactor, wherein (A) prior to the commencement of step (a), the reactor contains a heel of an aqueous tetrathiocarbonate salt solution, (B) the contents of the reactor are stirred during step (a), (C) the pressure within the reactor during step (a) is about 5 to about 30 psig, (D) the sulfur and carbon disulfide are added to the reactor in approximately stoichiometric quantities, (E) the sulfur and carbon disulfide present in the reactor are essentially completely reacted, (F) the sulfur is fed into the reactor as molten sulfur droplets having a particle size less than about 1/8 inch, (G) the atmosphere in the reactor contains less than about 0.3 weight percent oxygen, (H) the reactor during step (a) is maintained at a temperature of about 130° to about 180° F., (I) the sulfur and carbon disulfide are substantially separately added to the contents of the reactor, the sulfur being sprayed into the reactor (i) through a vapor space above the aqueous solution and (ii) without the molten sulfur droplets contacting the inside surface of the reactor, and the carbon disulfide being introduced into the reactor below the surface of the aqueous solution, (J) the hydroxide is added to the reactor in a stoichiometric excess of about 5 to about 10 weight percent, (K) the hydrogen sulfide is added to the reactor in a stoichiometric excess of about 5 to about 10 weight percent, (L) the effluent contains about 50 or more weight percent tetrathiocarbonate salt, and (M) the tetrathiocarbonate salt is selected from the group consisting of sodium tetrathiocarbonate, potassium tetrathiocarbonate, and lithium tetrathiocarbonate.

23. The process of claim 22 wherein the reactor during step (a) is maintained at a temperature of about 140° to about 180° F.

24. The process of claim 22 wherein the water employed in the process is carbonate-free and bicarbonate-free water.

25. The process of claim 22 wherein the water employed in the process is carbonate-free and bicarbonate-free water and the effluent contains greater than about 48 weight percent tetrathiocarbonate salt.

26. The process of claim 22 wherein the water employed in the process is carbonate-free and bicarbonate-free water and the effluent contains greater than about 50 weight percent tetrathiocarbonate salt.

27. The process of claim 22 wherein the water employed in the process is carbonate-free and bicarbonate-free water and the effluent contains greater than about 55 weight percent tetrathiocarbonate salt.

* * * * *